United States Patent
Fischer et al.

(10) Patent No.: US 6,870,461 B2
(45) Date of Patent: Mar. 22, 2005

(54) INTEGRATED RECEIVING/BACKSCATTERING ARRANGEMENT FOR CONTACTLESS DATA TRANSMISSION

(75) Inventors: Martin Fischer, Gleichen (DE); Ulrich Friedrich, Ellhofen (DE); Udo Karthaus, Ulm (DE); Dirk Ziebertz, Eberstadt (DE)

(73) Assignee: ATMEL Germany GmbH, Heilbronn (DE)

( * ) Notice: Subject to any disclaimer, the term of this patent is extended or adjusted under 35 U.S.C. 154(b) by 249 days.

(21) Appl. No.: 10/308,248

(22) Filed: Dec. 2, 2002

(65) Prior Publication Data
US 2003/0102961 A1 Jun. 5, 2003

(30) Foreign Application Priority Data
Dec. 1, 2001 (DE) .......................................... 101 58 442

(51) Int. Cl.[7] ................................................ H04Q 5/22
(52) U.S. Cl. ...................... 340/10.1; 340/572.1; 342/51
(58) Field of Search ............................. 340/10.1, 10.4, 340/572.1, 572.4; 342/51, 44, 42; 29/592.1, 825, 829

(56) References Cited

U.S. PATENT DOCUMENTS

| | | | |
|---|---|---|---|
| 5,206,639 A | | 4/1993 | Kamens |
| 5,598,169 A | * | 1/1997 | Drabeck et al. ............ 343/701 |
| 5,606,323 A | * | 2/1997 | Heinrich et al. .......... 340/10.34 |
| 6,100,790 A | * | 8/2000 | Evans et al. ................ 340/10.3 |
| 2002/0149484 A1 | * | 10/2002 | Carrender ................... 340/10.1 |

FOREIGN PATENT DOCUMENTS

| | | |
|---|---|---|
| DE | 4239065 | 5/1994 |
| DE | 19614455 | 10/1997 |
| DE | 19652324 | 6/1998 |
| DE | 10002501 | 7/2001 |
| EP | 0599143 | 6/1994 |
| EP | 1061663 | 12/2000 |
| GB | 2202415 | 9/1988 |

* cited by examiner

*Primary Examiner*—Thomas Mullen
(74) *Attorney, Agent, or Firm*—W. F. Fasse; W. G. Fasse

(57) ABSTRACT

A receiving/backscattering arrangement for carrying out a contactless data transmission includes an integrated circuit having two antenna contacts, a series arrangement of three high quality capacitances connected between the two antenna contacts, whereby the middle capacitance is an MOS varactor, a controllable variable voltage source connected across the MOS varactor, and a control unit that controls the voltage source. The receiving/backscattering arrangement is especially a passive transponder with a rectifier connected between the antenna contacts, or a semi-passive transponder including a battery or solar cell, to provide the required supply voltage for the circuit. The arrangement achieves a large communication range, for receiving and modulating an interrogation signal, and back-scattering the modulated response signal with a high efficiency and low losses. The integrated circuit structure is compact and economical.

24 Claims, 3 Drawing Sheets

INTEGRATED RECEIVING/ BACKSCATTERING ARRANGEMENT FOR CONTACTLESS DATA TRANSMISSION

PRIORITY CLAIM

This application is based on and claims the priority under 35 U.S.C. §119 of German Patent Application 101 58 442.3, filed on Dec. 1, 2001, the entire disclosure of which is incorporated herein by reference.

FIELD OF THE INVENTION

The invention relates to a receiving and backscattering arrangement that receives and modulates an interrogation signal, and reflects or backscatters the modulated signal as an answer or response signal, to carry out a contactless data transmission.

BACKGROUND INFORMATION

A receiving and backscattering arrangement of the above mentioned general type is known from the published European Patent Application 0,599,143 A2. In the known arrangement, a phase modulation of the received signal is carried out by means of the voltage controlled capacitance of a varactor. Thereby, an interrogation, polling or inquiry signal transmitted by a first interrogation device is received and backscattered as a response or answer signal by the answering device. A disadvantage of the known receiving and backscattering arrangement is that it has a relatively low efficiency with relatively high losses, and therefore the communication range is drastically limited. A further disadvantage is that the discrete construction of the known receiving and backscattering arrangement is relatively cost intensive and cannot be further miniaturized.

SUMMARY OF THE INVENTION

In view of the above, it is an object of the invention to provide a receiving and backscattering arrangement for carrying out a contactless data transmission, which achieves a high efficiency and thus an increased communication range, and which has a simple construction that is compact and may be economically produced. The invention further aims to avoid or overcome the disadvantages of the prior art, and to achieve additional advantages, as apparent from the present specification. The attainment of these objects, however, is not a required limitation of the invention.

The above objects have been achieved according to the invention in a receiving/backscattering arrangement for carrying out a contactless data transmission, by receiving and modulating an interrogation signal by backscattering the modulated response or answer signal. The receiving/ backscattering arrangement comprises an integrated circuit having two contact surfaces for connection to an antenna, e.g. to the two poles or legs of a dipole antenna, as well as a series circuit arrangement of a first capacitance, a second capacitance, and a third capacitance connected between the two antenna contact surfaces, whereby the second capacitance comprises a variable capacitance varactor.

According to the invention, the impedance (and particularly mainly the imaginary part of the impedance) of the input antenna circuit can be easily varied with low losses in the receiving/backscattering arrangement. Thereby, the receiving/backscattering arrangement receives an interrogation signal, and modulates at least a portion of the received interrogation signal by changing the phase, to form a modulated answer or response signal having a changed phase, which is backscattered from the receiving/backscattering arrangement. The series arrangement of the first, second and third capacitances connected between the two antenna contacts controls the modulation of the backscattered portion of the interrogation signal. Particularly, this controlled modulation is achieved by the varactor that embodies the second capacitance, which is arranged in series between the first and third capacitances. The varactor is controlled to vary its impedance (and particularly the imaginary part thereof), so that it phase-shift modulates and backscatters a portion of the received signal on the conductor lines connected to the antenna contacts. The series connection of the three capacitances, with the variable capacitance varactor in the middle, ensures that the varactor is DC-decoupled from the antenna contacts between the first and third capacitances, which are embodied, for example, as normal capacitors each respectively having a fixed capacitance.

Preferably, the varactor is embodied as an MOS varactor. Fabrication of the arrangement should preferably be compatible with standard CMOS processes. Also, it is necessary to achieve a good tuning adaptability (tuning range vs. surface area requirement) as well as a high quality factor. Therefore, it is especially advantageous to use a controllable gate capacitance, and particularly a CMOS varactor, to embody the second capacitance. While the use of a controllable gate capacitance would be CMOS compatible, it is not as advantageous in view of the tunability and the quality factor (e.g. due to losses through the structure, and consequent transmission range limitations). On the other hand, CMOS accumulation mode varactors are both CMOS compatible as well as highly tunable and provide a high quality factor. By using a CMOS accumulation mode varactor as the second capacitance, it is possible to make full use of the complete tuning range, i.e. capacitance variation range, of the varactor, because polarity reversals on the varactor are possible so that the varactor can modulate the signal with both capacitance polarities. Thereby, the full tuning range can be achieved via the series arrangement of the three capacitances, because the control voltage applied to the varactor by a controllable voltage source is independent of the other potentials present on the conductor lines connected to the antenna contacts.

One advantage of the inventive receiving/backscattering arrangement is that the impedance and thus the backscattering power can be varied especially effectively for a data transmission in the high frequency range, for example at 868 MHz, in that the parasitic losses are minimized. Investigations and experiments conducted by the applicants have shown that the quality or Q factor of the antenna resonant circuit can be considerably increased by providing the MOS varactor as the second capacitance in the above mentioned series connection of three capacitances. Thereby, the communication range is increased. Furthermore, the first and third capacitances suppress an influence on the antenna circuit when applying a modulation voltage to the varactor, because the frequency of the modulation voltage is substantially smaller than the frequency of the carrier signal. An additional advantage is that the integration of the capacitances into the integrated circuit with the other components of the antenna circuit considerably reduces the costs for the overall fabrication of the receiving/backscattering arrangement.

In a further detailed development of the receiving/ backscattering arrangement, the integrated circuit arrangement particularly includes a modulation controller or controllable voltage source for achieving the impedance variation of the MOS varactor. In this manner, the backscattering power may especially advantageously be varied, whereby the backscattered portion of the interrogation signal, i.e. the response signal, comprises a phase modulated component. This is advantageous because a data transmission by means of a phase modulation is less sensitive to interference or the like, than a data transmission by means of load or amplitude modulation. Investigations conducted by the applicant have shown that a reliable data transmission and a high data transmission rate can especially be achieved when the imaginary phase modulation components are symmetrical with respect to the real part axis.

According to a further embodiment feature of the inventive receiving/backscattering arrangement, it is advantageous to construct the first and third capacitances from three respective stacked conductive layers applied on a semiconductor substrate. More particularly, a dielectric layer is arranged between the first and second conductive layers, and an insulating layer is arranged between the second and third conductive layers, while the third conductive layer is arranged on the semiconductor substrate. The third conductive layer is advantageously connected in a low impedance manner to a reference potential or voltage, e.g. ground. It is further advantageous that the third conductive layer has a larger surfacial extent or area size in comparison to the first or second conductive layers. The third conductive layer advantageously is a common layer for both the first and third capacitances. In this manner, the quality or Q factor of the serial capacitance arrangement is increased and the communication range is extended.

The inventive receiving/backscattering arrangement may especially advantageously be used in an overall communication system, for example, comprising the inventive receiving/backscattering arrangement as a transponder, and a separate transmitter/receiver device as a base station. The base station emits an interrogation signal, and the inventive transponder modulates at least a portion of the received interrogation signal to form a response signal, which it backscatters back to the base station.

The inventive receiving/backscattering arrangement is especially advantageously used as a passive transponder or wireless sensor, that is to say a transponder or wireless sensor which does not include a self-contained power source and does not include a physical connection to an external power source, but rather in which the energy required to supply its integrated circuit is extracted or absorbed from the electromagnetic field of the interrogation signal emitted by the base station, for example by a rectifier connected to the antenna contacts to absorb and rectify a portion of the received interrogation signal. In such a passive transponder, even with all of the operating power being absorbed from the received signal field, the series arrangement of the three capacitances according to the invention, in connection with the high circuit qualities or Q-factors, makes it possible to increase the communication range to several meters.

An alternative embodiment of the invention involves a semi-passive rather than fully passive transponder or wireless sensor, which includes an active voltage supply such as a solar cell or battery rather than a passive power extraction device such as a rectifier or the like. Thus, the semi-passive transponder does not extract or absorb its operating power from the received signal field, but rather supplies its own required operating power from the battery or solar cell or the like. The backscattering of the modulated signal by the series capacitance arrangement, however, remains a passive backscattering "reflection" of the modulated received signal, and does not involve an active signal transmission. Since the circuit is not powered from the received HF field, the signal losses are substantially lower than in the case of a fully passive transponder, so that the communication range can be substantially increased because a considerably greater HF power can be backscattered. In other words, in the semi-passive embodiment, a much larger proportion of the incident HF power is backscattered, in comparison to the fully passive embodiment in which some of the incident HF power is absorbed to power the circuitry.

Furthermore, since the series circuit of the three capacitances that achieves the backscattering modulation is predominantly capacitive, the modulation is predominantly a phase shift modulation rather than an amplitude modulation. This also contributes to an increased communication range, due to the improved signal to noise ratios of a PSK (phase shift keying) modulation in comparison to an ASK (amplitude shift keying) modulation.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1A:
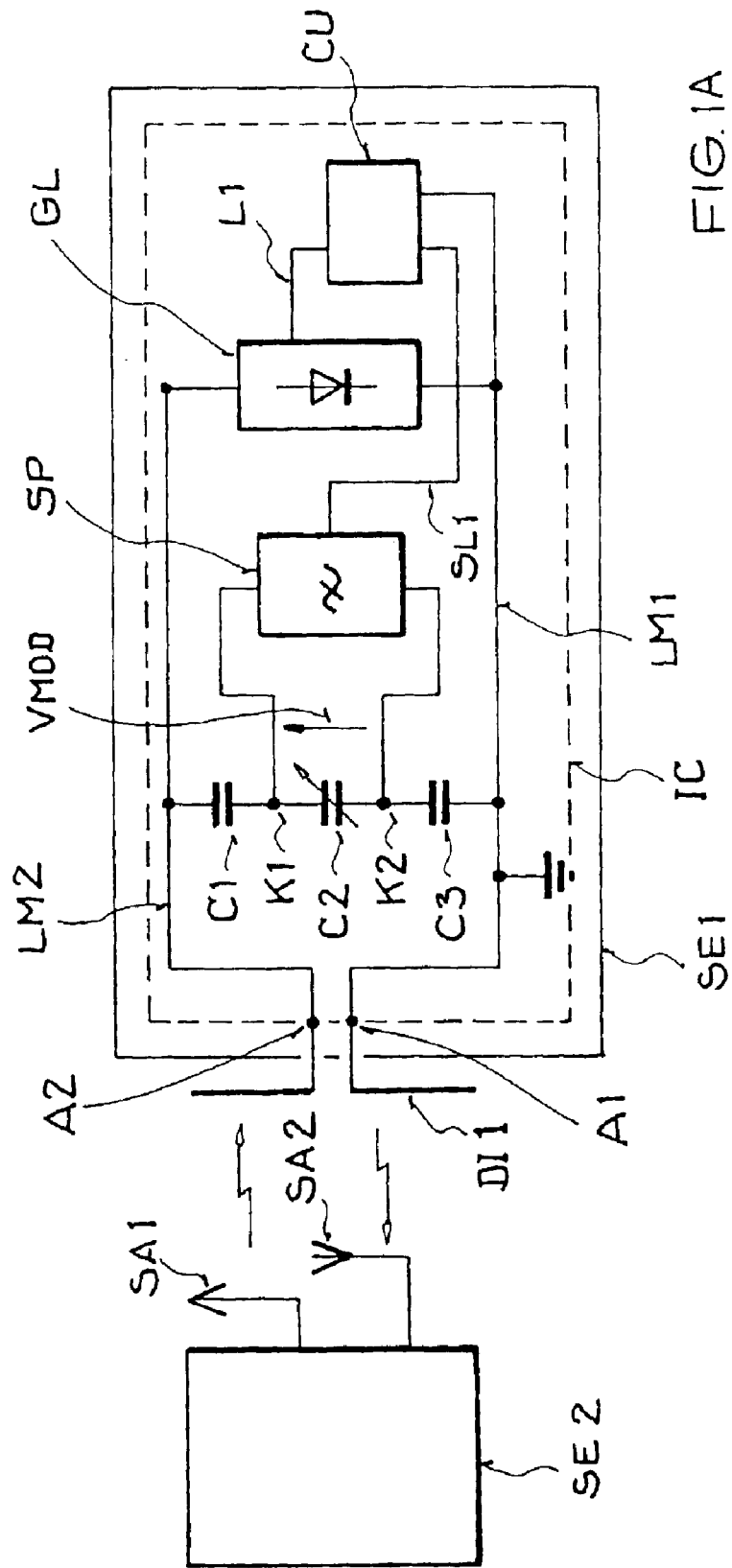
FIG. 1A is a schematic block circuit diagram of the inventive receiving/backscattering arrangement embodied as a fully passive transponder, with a series circuit connection of three capacitances between the antenna input contacts of the integrated circuit.

FIG. 1A schematically shows a high frequency communication system for carrying out a bi-directional contactless data transmission, including a transmitter/receiver device SE2, for example a base station, and a receiving/backscattering arrangement SE1, for example a passive transponder. The transmitter/receiver device SE2 emits an interrogation or inquiry signal through a transmitting antenna SA1. This signal is received by the antenna of the receiving/backscattering arrangement SE1, where it is modulated, and backscattered as a response or answer signal. Then, the backscattered response signal is received by the transmitter/receiver device SE2 through a receiving antenna SA2. The transmitter/receiver device SE2 can have any conventionally known structure and operation for transmitting and receiving the signals as described herein. The invention is particularly directed to the construction of the receiving/backscattering arrangement SE1, which will now be described in detail.

The receiving/backscattering arrangement SE1 comprises a dipole antenna DI1, and an integrated circuit IC having two antenna contacts A1 and A2, to which the two poles or legs of the dipole antenna DI1 are respectively connected. Within the integrated circuit IC, the contact A1 is connected by a conductor line LM1 to a reference potential or voltage, e.g. ground, while the contact A2 is connected to a further conductor line LM2. Furthermore, the integrated circuit IC includes a series circuit of a first capacitance C1, a second capacitance C2 provided by an MOS varactor C2, and a third capacitance C3, connected successively in series between the conductor lines LM2 and LM1. The series circuit includes a first connection node K1 between the first capacitance C1 and the second capacitance C2, and a second connection node K2 between the second capacitance C2 and the third capacitance C3. A modulation controller or particularly a controllable voltage source SP further embodied in the integrated circuit IC is connected to the connection nodes K1 and K2 so as to apply a controllable variable voltage VMOD to the varactor C2. Further, a rectifier GL is also integrated in the integrated circuit IC and is connected to the conductor lines LM1 and LM2. The rectifier GL is additionally connected through a line L1 with a control unit CU of the integrated circuit IC. The control unit CU is further connected to the conductor line LM1 and through a control line SL1 with the controllable voltage source SP.

The functional operation of the receiving/backscattering arrangement SE1 will now be explained. The HF interrogation signal transmitted by the transmitter/receiver device SE2 is received by the dipole antenna DI1 of the receiving/backscattering arrangement SE1 embodied as a passive transponder. A portion of the received HF signal on the conductor lines LM1 and LM2 is absorbed and rectified by the rectifier GL to provide a supply voltage for operating the integrated circuit IC through the control unit CU. Another portion of the received signal, i.e. the portion that is not absorbed to provide the operating supply voltage, is reflected or scattered back from the dipole antenna DI1. When there is a sufficient supply voltage, i.e. when an interrogation signal with a sufficient signal strength is received by the receiving/backscattering arrangement SE1, the control unit CU controls the voltage source SP to apply the controllable and variable voltage VMOD to the MOS varactor C2. Thereby, the capacitance of the MOS varactor C2 is varied in response to and dependent on the magnitude of the voltage VMOD. Through this variation of the capacitance of the MOS varactor C2, the total impedance (and particularly the imaginary part of the impedance) of the overall arrangement of circuit components connected with the conductor lines LM1 and LM2 is correspondingly varied. This impedance variation in turn causes a variation of the respective portions of the received signal that are respectively absorbed or scattered back.

In response to and under the control of the varying control voltage VMOD, this variation of the backscattered signal portion achieves a phase modulation of the backscattered signal. The phase modulation is controlled by the modulation controller SP to convey any desired data or signal information in the backscattered signal. In this context, the frequency of the voltage VMOD is small in comparison to the frequency of the received HF signal. Therefore, the first and third capacitances C1 and C3 can effectively suppress an influence on the HF signal present on the second and first conductor lines LM2 and LM1. In order to reduce the losses of this arrangement, the capacitances C1 to C3 are preferably embodied as capacitors with a high quality, i.e. with a small real part and a large imaginary part of the impedance thereof. In this manner, an effective phase modulation of the backscattered signal can be achieved through the voltage VMOD. Furthermore, the range of the data transmission is increased, because the signal absorption essentially only takes place in the rectifier GL and not in the series circuit of the capacitors.

Figure 1B:
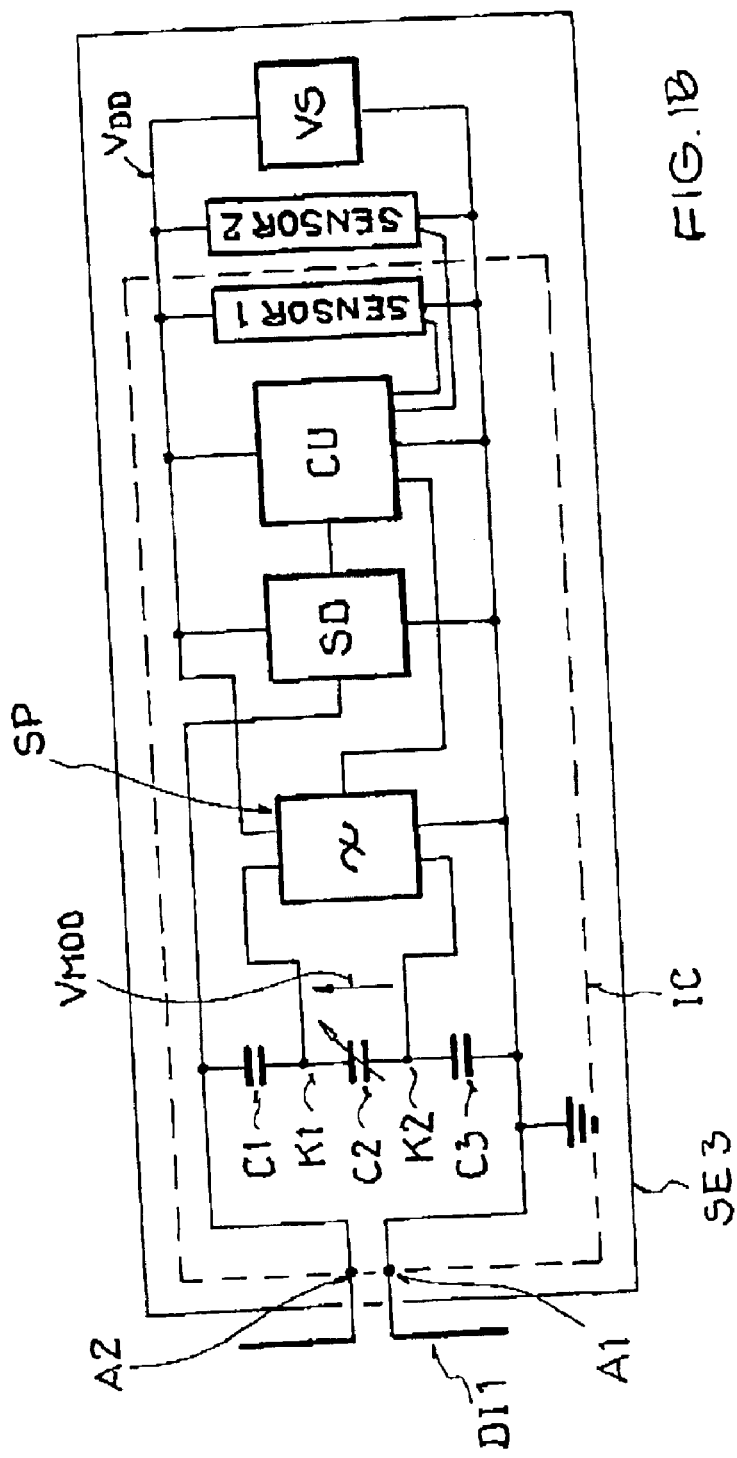
FIG. 1B is a schematic block diagram similar to FIG. 1A, but showing an embodiment of the inventive arrangement as a semi-passive transponder having a battery or solar cell as a voltage supply.

FIG. 1B shows an alternative embodiment of the inventive receiving/backscattering arrangement SE3 in the form of a semi-passive transponder or wireless sensor. This embodiment generally corresponds to and shares common features and functions with the passive embodiment of FIG. 1A as discussed above. Primarily the differences will be discussed. Most significantly, this arrangement SE3 does not include a rectifier GL for absorbing and rectifying the required operating power from the received signal like the above discussed arrangement SE1. Instead, the arrangement SE3 includes a voltage supply VS such as a battery or solar cell external to the integrated circuit IC, but connected to the integrated circuit IC for supplying the operating voltage VDD thereto.

Like the passive arrangement SE1 of FIG. 1A, the semi-passive arrangement SE3 of FIG. 1B also comprises a series circuit of the three capacitances C1, C2, and C3, a controllable voltage source or modulation controller SP connected to the varactor C2 to control the variable impedance thereof for controlling the modulation achieved thereby, and a main control unit CU that controls the voltage source SP. In the present embodiment, the external voltage supply VS such as a battery or solar cell VS is connected to the control unit CU and the controllable voltage source SP to provide the operating voltage VDD thereto. The arrangement may further include a signal detector SD, for example embodied as an RSSI (received signal strength indicator) circuit, which is connected to the antenna contact conductor lines LM1 and LM2 as well as to the external voltage supply VS.

The input impedance of the circuit is determined by the impedance of the signal detector unit SD, as well as the impedance of the series circuit of the three capacitances C1, C2, and C3, which is controlled by the modulation controller or controllable voltage source SP. Since there is no rectifier GL as in the passive arrangement SE1, the voltage losses at the antenna DI1 are significantly reduced, so that a considerably larger HF power is backscattered or reflected by this semi-passive arrangement SE3 (for a given received signal strength). This gives the semi-passive arrangement SE3 a considerably greater communication range than the fully passive arrangement SE1.

As in the passive arrangement SE1, the modulation controller or controllable voltage source SP is controlled by the control unit CU, which may be embodied as a microprocessor or as a finite state machine, for example. In this context it is advantageous to store characteristic parameters or values, such as an identification number, in a memory, which may be integrated in the control unit CU or be embodied as a separate unit, for example as an EEPROM.

Other units, e.g. memory units or sensors SENSOR1, SENSOR2 for sensing any type of characteristic value or parameter, may additionally be connected to the circuit arrangement, and particularly to the control unit CU. Thereby, for example, surrounding environmental conditions or the like may be sensed, and corresponding signals may be returned to the transmitter/receiver arrangement SE2 by a corresponding modulation of the backscattered response signal. Also, the transmitter/receiver arrangement SE2 may program or control the operation of the various units such as memory units and sensors, and may read out values stored in the memory units or the values measured by the sensors, by transmitting appropriate control commands in the transmitted interrogation signal. These control commands are received, for example by the signal detection unit SD, and are then provided to and evaluated by the control unit CU, which responsively controls the operation of the arrangement. These features also apply to the passive arrangement SE1, but are especially achievable with a broader scope in the semi-passive arrangement SE3 because the battery VS or the like can provide all of the operating power required by any additional devices or units that are connected to the basic circuit.

Figure 2A:
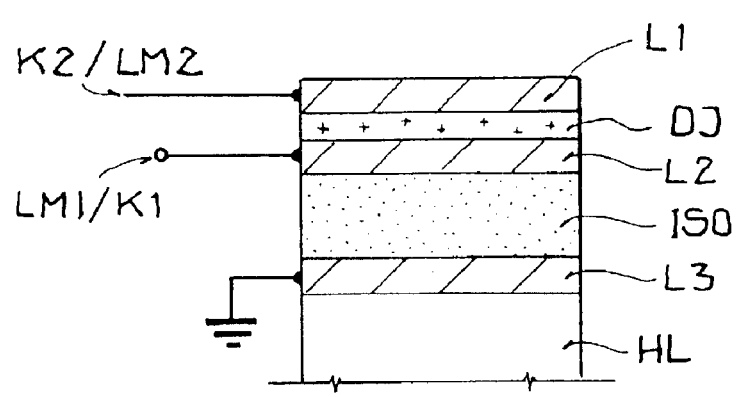
FIG. 2A is a schematic cross-sectional view of the general layer sequence for forming the first and third capacitances of the integrated circuit.

Now turning to FIG. 2A, this figure schematically shows a sequence of layers (e.g. semiconductor and/or metal layers) that can be implemented by standard CMOS processes to respectively form each one of the capacitances C1 and C3 as high quality capacitors integrated into the integrated circuit IC. A conductive layer L3 is formed, for example by doping or by metallization, on an underlying semiconductor substrate HL. This layer L3 is preferably of very low impedance, and is connected to the reference potential, e.g. ground. An insulating layer ISO is formed, for example by means of a CVD deposition or by an oxidation process, on the layer L3. The insulating layer ISO is preferably comparatively thick, for example preferably having a thickness greater than 1 $\mu$m.

Next, a conductive layer L2, which preferably has as low an impedance as possible, is formed, for example of doped silicon by means of a deposition process or of metal, on the insulating layer ISO. The layer L2 preferably includes two electrically separate areas or portions to respectively form the capacitances C1 and C3, as will be described below in connection with FIG. 2B, and these two portions are respectively connected with the connection node K1 for the capacitance C1, and with the conductor line LM1 for the capacitance C3.

Next, a thin dielectric layer DJ is formed, for example of a nitride by means of a CVD process, on the layer L2. This dielectric layer DJ is preferably comparatively thin, for example preferably with a thickness in the range of only a few tenths of a micron (e.g. 0.1 to less than 0.5 $\mu$m). Next, a conductor layer L1 that has as low an impedance as possible is formed, for example of highly doped polysilicon or of metal, on the dielectric layer DJ. This conductor layer L1 preferably has two electrically separate portions or areas for forming the respective capacitances C1 and C3, as will be discussed below in connection with FIG. 2B, whereby these two portions or areas of the layer L1 are respectively connected with the connection node K2 for the capacitance C3, and with the conductor line LM2 for the capacitance C1.

As mentioned above, the conductive layer L3 is connected to the reference potential with the lowest possible impedance, whereby the quality of the capacitances C1 and C3 is considerably increased, that is to say the real part of the impedance is sharply reduced.

Figure 2B:
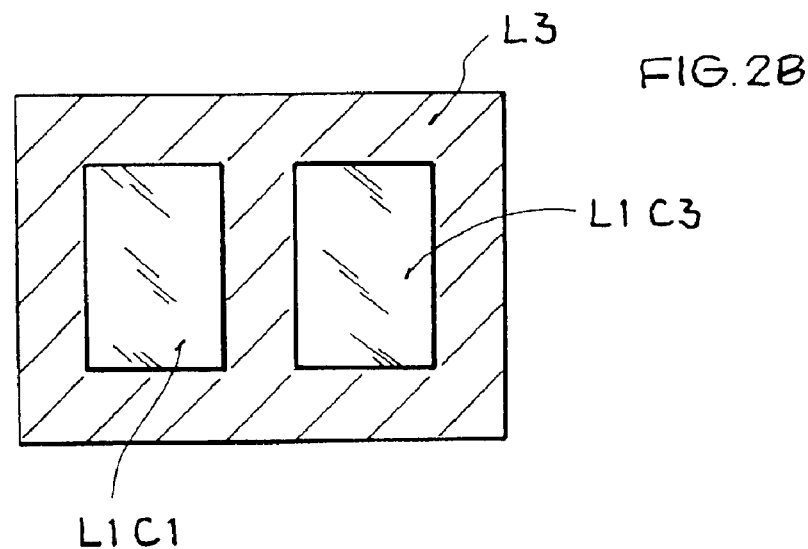
FIG. 2B is a schematic plan view of the layout of the layer arrangement for forming the first and third capacitances in the integrated circuit.

While FIG. 2A schematically represents a cross-section through a portion of the layered structure, it should be understood that the surface layout or plan arrangement of the layers preferably involves the surface area of the layer L3 being larger than the surface areas of the layers L1 and L2. FIG. 2B is a schematic plan view of the layout of the arrangement of the two capacitances C1 and C3. In this regard, while the two capacitances C1 and C3 respectively comprise separate portions of the upper layer L1, e.g. the portions L1C1 and L1C3, the two capacitances C1 and C3 share a common bottom layer L3. Thereby, the surficial extent or area of the layer L3 is selected to be larger than the sum of the surface areas of the layer portion L1C1 and the layer portion L1C3. Advantages achieved by this provision of the common layer L3 are the very low resistance or low impedance connection to the reference potential, and a small surface area requirement of the integrated circuit IC.

The varactor C2 can be embodied in any conventionally known structure and technique or process, to be integrated into the integrated circuit IC. The details of the layer structure thereof are not illustrated. but are conventionally known. The integrated circuit IC further includes the other integrated components described above, namely the voltage source SP, the rectifier GL, and the control unit CU, of which the layer structure is not illustrated, but which can be fabricated using any conventional semiconductor integrated circuit processing techniques and structures known for forming such integrated components.

It should also be understood that the integrated circuit arrangement may further comprise other functional units for an application as a passive transponder, for example, in accordance with any conventionally known passive transponder or wireless sensor circuits. Furthermore, the control unit CU carries out a demodulation of the received signal and an evaluation of the data and/or commands of the received signal, in any conventionally known manner, for example as is carried out in the context of an identification process as necessary for carrying out an authentication, for example. Such additional features are not significant to, or limitations of, the present invention, and may be in conformance with any conventionally known teachings.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A receiving/backscattering arrangement for carrying out a contactless data transmission, by receiving an interrogation signal, modulating at least a portion of said interrogation signal to form a modulated response signal, and backscattering said response signal, wherein:

said receiving/backscattering arrangement comprises an integrated circuit;

said integrated circuit comprises at least two antenna contacts for connection of an antenna thereto;

said integrated circuit further comprises a series circuit arrangement including a first capacitance, a second capacitance, and a third capacitance, connected in series between said two antenna contacts;

said second capacitance is a varactor; and said series circuit arrangement is adapted to modulate at least said portion of said interrogation signal to form said response signal.

2. The receiving/backscattering arrangement according to claim 1, wherein said second capacitance is connected in series between said first capacitance and said third capacitance.

3. The receiving/backscattering arrangement according to claim 1, wherein said series circuit arrangement consists of said first capacitance, said second capacitance and said third capacitance connected electrically in series with each other.

4. The receiving/backscattering arrangement according to claim 1, wherein said varactor is an MOS varactor.

5. The receiving/backscattering arrangement according to claim 1, wherein said integrated circuit further comprises a controllable voltage source having controlled voltage output terminals that are connected to said varactor to apply a controlled variable voltage thereto so as to controlledly vary an impedance of said varactor.

6. The receiving/backscattering arrangement according to claim 5, wherein said integrated circuit further comprises a control unit that is connected to said controllable voltage source and adapted to control said voltage source to controlledly vary said impedance of said varactor so that said modulated response signal includes at least a phase modulated component with respect to said portion of said interrogation signal.

7. The receiving/backscattering arrangement according to claim 6, wherein said phase modulated component of said modulated response signal is symmetrical with respect to the real part axis.

8. The receiving/backscattering arrangement according to claim 1, wherein said integrated circuit comprises a layer structure respectively forming said first capacitance and said third capacitance, wherein said layer structure comprises a semiconductor substrate, first, second and third conductive layers stacked on said substrate, a dielectric layer arranged between said first and second conductive layers, and an electrically insulating layer arranged between said second and third conductive layers.

9. The receiving/backscattering arrangement according to claim 8, wherein said third conductive layer has a low impedance connection to a reference potential, and has an area size larger than an area size of at least one of said first conductive layer and said second conductive layer.

10. The receiving/backscattering arrangement according to claim 9, wherein said third conductive layer is a single integral layer that is common to both said first capacitance and said third capacitance.

11. The receiving/backscattering arrangement according to claim 8, wherein said dielectric layer has a thickness of less than 0.5 $\mu$m, and said insulating layer has a thickness greater than 1 $\mu$m.

12. The receiving/backscattering arrangement according to claim 8, wherein said conductive layers are respective metal layers.

13. The receiving/backscattering arrangement according to claim 8, wherein said conductive layers are respective layers of highly doped semiconductor material.

14. The receiving/backscattering arrangement according to claim 8, wherein:
said first conductive layer includes a first layer first portion and a first layer second portion that are electrically isolated from each other;
said second conductive layer includes a second layer first portion and a second layer second portion that are electrically isolated from each other;
said dielectric layer includes a first dielectric layer portion between said first layer first portion and said second layer first portion, and a second dielectric layer portion between said first layer second portion and said second layer second portion;
said first layer first portion and said second layer first portion with said first dielectric layer portion therebetween form said first capacitance; and
said first layer second portion and said second layer second portion with said second dielectric layer portion therebetween form said third capacitance.

15. The receiving/backscattering arrangement according to claim 1, wherein said receiving/backscattering arrangement is a passive transponder that does not include a self-contained power source and does not include a physical connection to an external power source.

16. The receiving/backscattering arrangement according to claim 1, wherein said integrated circuit further comprises a modulation controller having controlled voltage output terminals that are connected to said varactor to apply a controlled variable voltage thereto so as to controlledly vary an impedance of said varactor, and wherein said receiving/backscattering arrangement is a semi-passive transponder further comprising a battery or a solar cell as a voltage supply connected to said modulation controller to apply an operating supply voltage to said modulation controller.

17. The receiving/backscattering arrangement according to claim 16, wherein said receiving/backscattering arrangement further comprises a signal detector circuit connected to said antenna contacts to receive and detect said interrogation signal, and a main control unit connected to said signal detector circuit and to said modulation controller, wherein said voltage supply is further connected to said signal detector circuit and to said main control unit to apply said operating supply voltage thereto.

18. The receiving/backscattering arrangement according to claim 1, wherein said integrated circuit further comprises a modulation controller having controlled voltage output terminals that are connected to said varactor to apply a controlled variable voltage thereto so as to controlledly vary an impedance of said varactor, wherein said receiving/backscattering arrangement is a semi-passive wireless sensor arrangement and said modulated response signal is a sensor data signal, and wherein said receiving/backscattering arrangement further comprises a main control unit connected to said modulation controller, at least one sensor connected to said main control unit, and a battery or a solar cell as a voltage supply connected to said modulation controller, said main control unit, and said at least one sensor to apply an operating supply voltage respectively thereto.

19. A communication system comprising the receiving/backscattering arrangement according to claim 1 in combination with a transmitter/receiver device for transmitting said interrogation signal that is received, modulated and backscattered by said receiving/backscattering arrangement.

20. A receiving/backscattering arrangement comprising:
an antenna; and
an integrated circuit, which comprises:
a first conductor line connected to a first terminal of said antenna;
a second conductor line connected to a second terminal of said antenna; and
a first capacitance, a second capacitance, and a third capacitance connected successively in series with one another between said first conductor line and said second conductor line, wherein said second capacitance is a variable capacitance varactor.

21. The receiving/backscattering arrangement according to claim 20, wherein said integrated circuit further comprises a controllable variable voltage supply connected to a first connection node between said first capacitance and said varactor and to a second connection node between said varactor and said third capacitance.

22. The receiving/backscattering arrangement according to claim 20, wherein said integrated circuit further comprises a rectifier connected between said first conductor line and said second conductor line, in parallel with said first, second and third capacitances.

23. The receiving/backscattering arrangement according to claim 20, wherein said integrated circuit comprises a layer structure respectively forming said first capacitance and said third capacitance, wherein said layer structure comprises a semiconductor substrate, first, second and third conductive layers stacked on said substrate, a dielectric layer arranged between said first and second conductive layers, and an electrically insulating layer arranged between said second and third conductive layers, with said third conductive layer arranged on said substrate.

24. The receiving/backscattering arrangement according to claim 23, wherein:

said first conductive layer includes a first layer first portion and a first layer second portion that are electrically isolated from each other;

said second conductive layer includes a second layer first portion and a second layer second portion that are electrically isolated from each other;

said dielectric layer includes a first dielectric layer portion between said first layer first portion and said second layer first portion, and a second dielectric layer portion between said first layer second portion and said second layer second portion;

said first layer first portion and said second layer first portion with said first dielectric layer portion therebetween form said first capacitance; and said first layer second portion and said second layer second portion with said second dielectric layer portion therebetween form said third capacitance.

* * * * *